United States Patent
Xu et al.

(10) Patent No.: US 11,959,934 B2
(45) Date of Patent: Apr. 16, 2024

(54) HIGH PRECISION WEIGHING SYSTEM AND WEIGHING METHOD, THERMOGRAVIMETRIC ANALYSER AND STORAGE MEDIUM

(71) Applicants: Mettler Toledo Precision Instrument Company Limited, Changzhou (CN); Mettler Toledo Measurement Technology Company Limited, Changzhou (CN); Mettler-Toledo International Trading (Shanghai) Co., Ltd., Shanghai (CN)

(72) Inventors: Lei Xu, Changzhou (CN); Jean-Christophe Emery, Shanghai (CN)

(73) Assignees: Mettler Toledo Precision Instrument Company Limited, Changzhou (CN); Mettler Toledo Measurement Technology Company Limited, Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 903 days.

(21) Appl. No.: 16/982,695

(22) PCT Filed: Jan. 28, 2019

(86) PCT No.: PCT/CN2019/073344
§ 371 (c)(1),
(2) Date: Sep. 21, 2020

(87) PCT Pub. No.: WO2019/165865
PCT Pub. Date: Sep. 6, 2019

(65) Prior Publication Data
US 2021/0293682 A1    Sep. 23, 2021

(30) Foreign Application Priority Data
Feb. 27, 2018   (CN) .......................... 201810163724.6

(51) Int. Cl.
*G01N 5/04*    (2006.01)
*G01G 23/01*   (2006.01)

(52) U.S. Cl.
CPC ........... *G01N 5/045* (2013.01); *G01G 23/012* (2013.01)

(58) Field of Classification Search
CPC .............................. G01N 5/045; G01G 23/012
See application file for complete search history.

(56) References Cited

U.S. PATENT DOCUMENTS 4,312,219 A * 1/1982 Lee .................... G01N 5/045
                                                       73/76
5,058,422 A * 10/1991 Shimauchi ........... G01G 23/012
                                                       73/1.13
(Continued)

FOREIGN PATENT DOCUMENTS

CN    201628570 U    11/2010
CN    106092803 A    11/2016
(Continued)

*Primary Examiner* — Nathaniel T Woodward
*Assistant Examiner* — Philip L Cotey
(74) *Attorney, Agent, or Firm* — Standley Law Group LLP; Jeffrey S. Standley; Adam J. Smith

(57) ABSTRACT

A high precision weighing system and weighing method has a weighing plate and weighing unit separation mechanism and a weight loading mechanism. The weighing plate and weighing unit separation mechanism controls separation of a weighing plate and a weighing unit, so that the weighing plate or the weighing plate and its carried material do not apply force to the weighing unit. The weight loading mechanism loads a weight onto the weighing unit or removes a weight from the weighing unit; the weighing system records (Continued)

a weighing value of the weighing unit during the action of the weighing plate and weighing unit separation mechanism and a sensitivity value during the action of the weight loading mechanism. The weighing system modifies the weighing value at the time of the most recent combination of the weighing plate and the weighing unit based on the recorded weighing and sensitivity values, achieving a high precision.

15 Claims, 2 Drawing Sheets

(56) References Cited

U.S. PATENT DOCUMENTS

| | | | | |
|---|---|---|---|---|
| 7,176,389 | B2* | 2/2007 | Iiduka | G01G 23/012 73/1.13 |
| 8,698,012 | B2* | 4/2014 | Huebler | G01G 19/4148 177/25.15 |
| 2004/0262047 | A1* | 12/2004 | Iiduka | G01G 23/012 177/50 |
| 2005/0023047 | A1* | 2/2005 | Yoshikuwa | G01G 23/012 177/229 |
| 2010/0181118 | A1* | 7/2010 | Izumo | G01G 23/012 73/1.13 |
| 2010/0269954 | A1* | 10/2010 | Kaszkin | G01G 11/086 141/83 |
| 2012/0312069 | A1* | 12/2012 | Burkhard | G01G 23/012 73/1.13 |
| 2014/0150519 | A1* | 6/2014 | Iizuka | G01G 23/01 73/1.13 |
| 2014/0161150 | A1* | 6/2014 | Las Navas Garcia | B01F 33/85 73/864.91 |
| 2015/0101869 | A1* | 4/2015 | Burkhard | G01G 19/414 177/1 |

FOREIGN PATENT DOCUMENTS

| | | |
|---|---|---|
| CN | 206132197 U | 4/2017 |
| CN | 107036699 A | 8/2017 |
| JP | H07-280635 A | 10/1995 |

* cited by examiner

HIGH PRECISION WEIGHING SYSTEM AND WEIGHING METHOD, THERMOGRAVIMETRIC ANALYSER AND STORAGE MEDIUM

BACKGROUND OF THE INVENTION

1. Field of the Invention

The present invention relates to a weighing system and weighing method, a thermo-gravimetric analyser and a storage medium and, in particular, a high precision weighing system and weighing method, a thermo-gravimetric analyser and a storage medium.

2. The Related Art

In many weighing applications, it is necessary to monitor the continuous weight change of the material. Measurements and actions will carry out based on real-time weight information. Scales, like warehouse scale and counting scale, need to monitor the weight changes to conduct a batching action. In these applications, the materials are loaded on a sensor at the very beginning and weighed for few days to few months.

In some other weighing applications, measurement for tens of seconds to several hours. These applications are often accompanied with other function modules, wherein the effect of these functions are to change the weight of the material, such as using a thermal analysis method to evaporate water inside the material to assay the moisture content or just to measure the material weight change over time (material physical property change with temperature) and the like. These heating function modules usually make the sensor work under a harsh condition as integrated in one instrument.

Not only limited to the above-mentioned weighing applications, there exists an important issue for all long-time weight measurement applications: whether the displayed weight change is the real weight change of the material or a weighing sensor performance change over time during the long-time measurement? (Weighing sensor performance like creep, zero, and sensitivity change with time and environment.)

At present, in the prior art, to improve the measurement precision, an auxiliary test unit is generally used to reduce the environment influence on weighing sensors. However, in fact, in the weighing unit performance has temporal characteristics, which means the performances will change by time and environment.

Accordingly, at present, in order to eliminate the environment influence on the weighing sensor, higher precision weighing sensors are used or a structure of a more complicated design is often selected to ensure that the environment where the weighing unit is located is sufficiently stable, thereby reducing the influence of the surrounding environment on the weighing unit. However, there is currently no effective method to reduce the error caused by the weighing unit itself during a long-time measurement.

SUMMARY

The technical problem to be solved by the present invention is: in order to overcome the problem in prior art that the error of a weighing unit cannot be eliminated during a continuous weighing process, a weighing system and weighing method and a storage medium are provided. The present solution can eliminate the measurement error caused by the weighing unit zero and sensitivity change, thereby achieving a high measurement accuracy.

The above-mentioned technical problems are solved in the present invention by the following technical solutions:

The invention provides a weighing system comprising a weighing plate, a weighing unit, a separation mechanism and a weight loading mechanism;

wherein the separation mechanism is configured to control a separation of a weighing plate and the weighing unit, so that the weighing plate or the weighing plate including an object to weighed carried by the weighing plate apply no force to the weighing unit, and the weight loading mechanism is configured to load a weight onto the weighing unit or removes a weight from the weighing unit;

wherein the weighing system is configured to record a weighing value of the weighing unit during the action of the separation mechanism and a sensitivity during the action of the weight loading mechanism; and the weighing system is configured to modify the weighing value at the time of the most recent combination of the weighing plate and the weighing unit based on the recorded weighing value and sensitivity.

The weighing plate and weighing unit separation mechanism of the present invention functions control the separation and combination of the weighing plate and the weighing unit, wherein can be detected when the weighing plate and carried material decoupled from the weighing sensor and the weight can be detected when the weighing plate and the material carried thereof coupled from the weighing sensor. For the present invention, any structure that can control the separation and combination of the weighing plate and the weighing unit is applicable to the present invention.

Therefore, the action process of the weighing plate and weighing unit separation mechanism of the present invention comprises the entire action process of the separation of the weighing plate from the weighing unit and the recombination of the weighing plate and the weighing unit.

The weight loading mechanism of the present invention functions enable the loading/unloading of a weight on the weighing unit, and further enable the loading/unloading of a pre-set counterweight, so as to detect the characteristics of the weighing unit, for example, detect the sensitivity of the weighing unit and the like. Therefore, for the present invention, any structure that can enable the loading/unloading of a weight on the weighing unit is applicable to the present invention.

The sensitivity means the measurement precision of the weighing unit. For example: for a weighing sensor, it displays a value of 1000.00 at time 1 when loaded with a 1 kg weight but displays a value of 1000.05 at time 2 when loaded with the same 1 kg weight (assuming that this is caused by inconsistent environments at time 2 and time 1). Since it is the same 1 kg weight, which loaded at time 1 and time 2, the difference of 0.05 g is an error caused by the sensor sensitivity difference.

The weighing value at the time of the most recent combination of the weighing plate and the weighing unit refers to weighing data obtained by the weighing system that characterizes the weight of the material in the weighing plate at the time of the last combination of the weighing plate and the weighing unit before the weighing data is modified.

In the present invention, the finally output weighing value is modified with the weighing unit zero and the sensitivity detected in the weighing plate and weighing unit separation action and the weight loading/unloading action, thereby ensuring the weighing accuracy of the weighing unit during a long-time weighing process.

Preferably, the separation mechanism further comprises a weight transfer unit lying between the weighing plate and the weighing unit and transferring the weight of the material carried by the weighing plate to the weighing unit; or the separation mechanism is configured to control a weight transfer unit lying between the weighing plate and the weighing unit, so that the weighing plate or the weighing plate including the object to be weight carried by the weighing plate apply no force to the weighing unit.

The weight transfer unit of the present invention functions as a medium for transferring the weight of the material carried by the weighing plate between the weighing plate and the weighing unit, for example, the weight transfer unit can transfer weight in a horizontal manner or in a vertical manner, but the present invention does not limit the structure and manner thereby, namely, not limited to the horizontal manner or the vertical manner.

Preferably, the weighing system is configured to record, at a pre-set period, the weighing value of the weighing unit during the action of the separation mechanism and the sensitivity during the action of the weight loading mechanism.

In the present invention, by periodically performing the action of the weighing plate and weighing unit separation mechanism and the action of the weight loading mechanism, and recording corresponding weighing unit zeros and sensitivities, the accuracy of the subsequently modified weighing data is improved, thereby maintaining the precision of the weighing unit.

Preferably, the weighing system records weighing values during the action of the separation mechanism, at the time of separation of the weighing plate and the weighing unit and at the time of combination of the weighing plate and the weighing unit.

Preferably, the weighing system further comprises at least one weighing environment auxiliary module for reducing the influence of environment change on the weighing system.

In the present invention, the existing weighing environment auxiliary module may further be utilized to aid in maintaining the stability of the weighing environment, wherein different existing weighing environment auxiliary modules which have been used in the practical applications may be adopted according to the practical applications of the weighing system, and the present invention does not limit the type, the structure and the usage of the weighing environment auxiliary modules.

Preferably, the weighing system further comprises a controller that controls the action of the separation mechanism and the action of the weight loading mechanism.

Preferably, the weighing system further comprises an environment sensor, which mounted on or nearby the weighing plate for acquiring environment parameters including information such as the temperature, the humidity, the heat flow, the radiation.

In the present invention, a weighing plate accessory refers to a space around the weighing plate, especially a spatial location where the environment parameters characterizing the weighing plate can be accurately detected.

In the present invention, these environment information detected by sensors around the weighing plate together with the weighing unit accuracy modification can used for more accuracy calculations, or give influence factors that might affect the change in the material weight.

Preferably, the weighing system further comprises a processor that records the weighing value of the weighing unit during the action of the separation mechanism and the sensitivity during the action of the weight loading mechanism, and calculates, modifies and outputs the latest weighing value.

Preferably, the controller further modifies the latest weighing value based on the environment parameter measured the environment sensor.

The present invention further provides a weighing method for a weighing system comprising a weighing plate, a weighing unit, a separation mechanism, and a weight loading mechanism, the method comprising the following steps of:

sequentially performing weighing plate and weighing unit separation actions by the separation mechanism and weight loading actions by the weight loading mechanism, during each weighing plate and weighing unit separation action, recording a weighing value, and during each weight loading action, recording a sensitivity; and modifying the latest weighing value based on the recorded weighing value and sensitivity.

The weighing plate and weighing unit separation action is an action conducted by the weighing plate and weighing unit separation mechanism as mentioned above, and the weight loading action is an action conducted by the weight loading mechanism as mentioned above.

Preferably, sequentially performing, at a pre-set test interval, weighing plate and weighing unit separation actions and weight loading actions, and respectively recording a weighing value during each weighing plate and weighing unit separation action and recording a sensitivity during each weight loading action.

Preferably, modifying the weighing value by means of the following formula, $$W\text{true} = W_i \times S_i / S_0$$

where Wture is a modified weighing value, Wi is a latest weighing value, Si is the latest recorded sensitivity, and S0 is a firstly recorded sensitivity.

Preferably, recording weighing values of the weighing unit during the action of the separation mechanism, at the time of separation of the weighing plate and the weighing unit and at the time of combination of the weighing plate and the weighing unit.

Preferably, calculating the weighing value Wi by the following formula, $$W_i = W_{fi} - W_{zi}$$

where Wfi is a weighing value of the weighing unit at the time of combination of the weighing plate and the weighing unit, and Wzi is a weighing value of the weighing unit at the time of separation of the weighing plate and the weighing unit.

The weighing value Wzi at separation of the weighing plate and the weighing unit is actually a zero point weighing data of the weighing unit measured at the time of separation of the weighing plate and the weighing unit, is the weighing. The weighing value Wfi at combination of the weighing plate and the weighing unit, and Wfi is the weighing data actually detected by the weighing unit at the time of combination of the weighing plate and the weighing unit. The difference there between is an actual weighing data, namely a weighing value Wi that can characterize the material weight in the weighing plate at the time of combination of the weighing plate and the weighing unit. Thus the real material weight is $$Wi = Wfi - Wzi$$

Preferably, calculating, after recording a weighing value during each weighing plate and weighing unit separation action and recording a sensitivity during each weight loading action, a weighing data change Wchange by means of the following formula, $$Wchange = Wi - W0$$

where Wi is a weighing value at the time of combination of the weighing plate and the weighing unit, and W0 is a weighing value at the time of the first combination of the weighing plate and the weighing unit;

and exiting the weighing procedure when Wchange exceeds a pre-set change threshold.

The weighing procedure is a weighing procedure performed by the weighing system on the material in the weighing plate, and such a weighing procedure is a weighing procedure commonly used in prior art, and the present invention does not limit the weighing procedure.

The present invention prompts the operating personnel of the system abnormality by means of an exit mechanism.

The present invention further provides a storage medium, characterized in that the storage medium comprises a stored program, and wherein the program, when running, is configured to control an apparatus in which the storage medium is located to execute the weighing method as mentioned above.

The present invention further provides a thermo-gravimetric analyser comprising the weighing system as mentioned above, wherein the separation mechanism controls the separation of the weighing plate and the weighing unit.

A sensor for detecting the environment parameter is placed on the thermo-gravimetric weighing plate, or the thermo-gravimetric weighing plate and the sensor are integrally formed.

The weighing method used during the weighing process is just the weighing method mentioned above.

The positive progress effects of the present invention lie in that:

The present invention achieves a very high precision, during a continuous weighing process, by eliminating a measurement error caused by changes in zero point, sensitivity and creep deformation of a weighing unit itself.

BRIEF DESCRIPTION OF THE DRAWINGS

The above and other features, natures, and advantages of the invention will be apparent by the following description of the embodiments incorporating the drawings, wherein.

DETAILED DESCRIPTION OF EMBODIMENTS

The present invention is further illustrated below by way of examples, but is not thus limited within the scope of the embodiments.

In the present invention, two mechanisms are introduced: a decoupling mechanism for separation and combination, and a weight loading mechanism for loading weight. The weighing plate separation and combination mechanism functions to realise the separation of the weighing unit and a weighted material during the weighing process, and after the separation of a weighing unit and the weighted material, record weighing sensor zero change during the whole weighing process, and at the same time, the influence of the creep deformation of the weighing unit can also be excluded.

The weight loading mechanism functions to realise the loading of weights on the weighing unit, and record the sensitivity change of the weighing unit during the whole weighing process.

In the present invention, when the weighing method is performed, during the whole measurement process, the two mechanisms can act at a pre-set interval and record weighing sensor zero and sensitivity at each interval. Based on a set interval, it is required to combine the zero-point error and the sensitivity error of the weighing unit to calculate the final real material weight change.

This weighing system and weighing method of the present invention can reduce the error caused by the weighing unit and improve the measurement precision of the material weight change. Moreover, the weighing sensor of the present invention can be various sensors or modules having weighing functions, for example, a strain gauge sensor, an electromagnetic force sensor, and a capacitive sensor and the like.

By way of the embodiments as described below, the implementations of the present invention are illustrated by way of examples.

Embodiment 1

Figure 1:
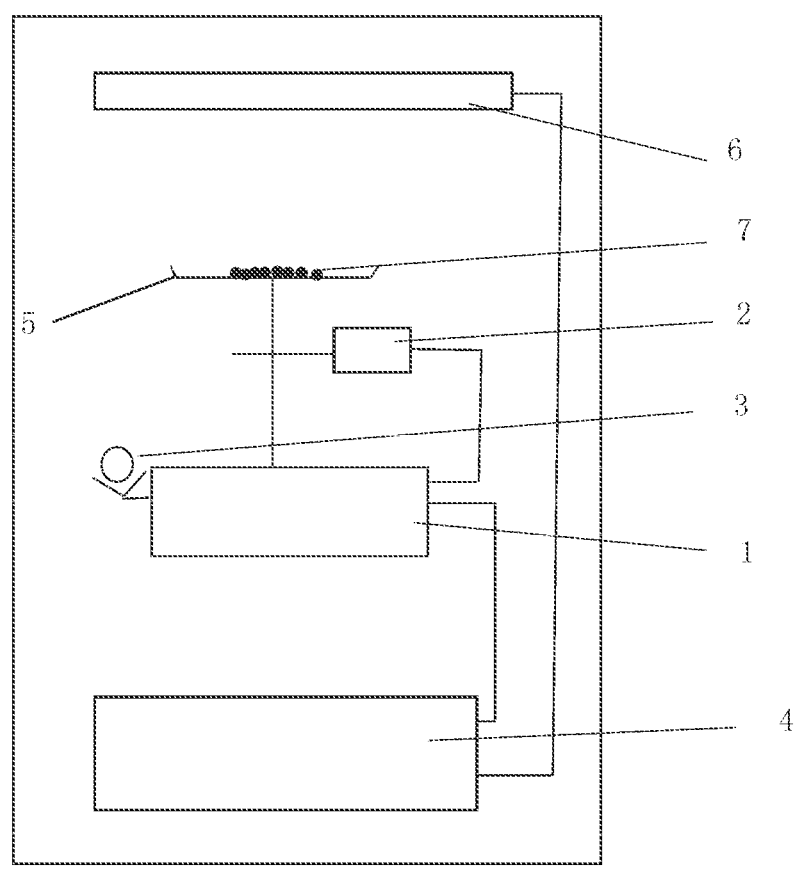
FIG. 1 is a schematic structural diagram of a weighing system of Embodiment 1 of the present invention.

As shown in FIG. 1, the weighing system in this embodiment comprises a weighing unit 1, a separation mechanism 2, an automatic loading mechanism 3, a controller 4, a weighing plate 5 and a weighing environment auxiliary module 6.

In this embodiment, the weighing unit 1 uses an electromagnetic sensor, and may also use, in other variants, a strain gauge sensor, a capacitive sensor and the like.

The separation mechanism 2 controls the separation and the combination of the weighing plate 5 and the weighing unit 1, so that the weighing plate and carried object thereby apply no force to the weighing unit 1, and the automatic loading mechanism 3 loads a weight onto the weighing unit 1 or removes a weight from the weighing unit 1. The controller 4 controls both the actions of the separation mechanism 2 and the automatic loading mechanism 3.

In another embodiment, a weight transfer unit is provided between the weighing plate 5 and the weighing unit 1, wherein the gravity of a material to be weighted on the weighing plate 5 is applied to the weighing unit 1 through the weight transfer unit. At the same time, the separation mechanism 2, by controlling the movement of the weight transfer unit, for example, by controlling the weight transfer unit to move away from the weighing unit 1, realises the control as regards whether to apply the gravity of the material to be weighted on the weighing plate 5 to the weighing unit 1, thereby realising the separation and combination of the weighing plate 5 and the weighing unit 1. In this embodiment, a weight transfer unit which transfer a weight in a vertical manner is used, while in another example, a weight transfer unit which uses other weight transfer manners, such as a horizontal manner, can also be used.

In another variant, the separation mechanism 2 also functions as a weight transfer unit, which applies the gravity of the material to be weighted on the weighing plate 5 to the weighing unit 1 through the weight transfer unit while realising the combination of the weighing plate 5 and the weighing unit 1.

The weighing system in this embodiment records weighing values of the weighing unit 1 at the time of separation and combination of the weighing plate 5 and the weighing unit 1 under the control by the scale rack separation mechanism 2. It also records the sensitivities obtained by the automatic loading mechanism 3 performing loading and unloading of a weight.

In another embodiment, the weighing system further comprises a processor for recording a weighing value of the weighing unit 1 during the process in which the controller 4 controls the action of the scale rack separation mechanism 2 and a sensitivity during the process in which the controller controls the action of the weight loading mechanism 3. Moreover, the processor can also calculate, modify and output the weighing value at the time of the last combination of the weighing plate and the weighing unit.

In this embodiment, the weighing environment auxiliary module 6 of the weighing system can reduce the influence of the environment change on the weighing system, and therefore this embodiment realises a rejection on the influence of the external environment, meanwhile excluding errors brought about by changes in zero point, sensitivity and creep deformation of the weighing unit 1 itself, thereby realising the high precision weighing of the weighing system.

In this embodiment, the weighing system realises the modification of weighing values during the process of object weighing by means of the weighing method described below.

Before the weighing method is performed, it is required to set a test interval, that is equivalent to set a time point for modifying and compensating for the zero point, the creep deformation and the sensitivity of the weighing unit 1, wherein the test interval can be an equidistant interval and also can be a non-equidistant interval.

After putting a tested material 7 in the weighing plate 5, the weighing method performs the following steps:

Step 101, the controller 4 controls the scale rack separation mechanism 2 to separate the weighing plate 5 from the weighing unit 1 and tests and records an initial zero point Wz0 of the weighing unit 1.

Step 102, the controller 4 controls the scale rack separation mechanism 2 to combine the weighing plate 5 with the weighing unit 1 and tests and records the weight Wf0 of the weighing unit 1. At this time, after the zero-point compensation, the actual initial quality of the tested material is W0=Wf0−Wz0.

Step 103, the controller 4 controls the action of the automatic loading mechanism 3 and tests an initial sensitivity S0 of the weighing unit 1.

Then the weighing system will continuously repeat steps 101-103 at a pre-set test interval, and obtain an actual quality Wi=Wfi−Wzi of the tested material, for which the zero point change of the weighing unit 1 is compensated, at a corresponding test interval i (i=1, 2, 3 . . . ), and the sensitivity Si of the weighing unit 1 at the corresponding test interval i.

Since the test interval is equivalent to a time point for modifying and compensating for the zero point, the creep deformation and the sensitivity of the weighing unit 1, it is assumed that if a modified weighing data is output at a test interval j, the weighing value modified by the following formula at the test interval j is:

$$Wtrue = Wj \times \frac{Sj}{S0}$$

where Wtrue is the modified weighing value at the test interval j, Wj is the actual quality of the tested material at the test interval j, Sj is the sensitivity at the test interval j, and S0 is an initially recorded sensitivity.

Assuming j=4, that is, when the number of times of repeating steps 101-103 reaches 4, the weighing data is output, and the value of j can be determined from the settings of the time and the test interval of the continuous weighing test or can be any manually set value.

In another embodiment, at the test interval j, the weighting data change Wchange is calculated by the following formula:

$$Wchange = Wj - W0$$

where Wj is the actual quality of the tested material at the test interval j, and W0 is an initially recorded actual quality of the tested material. It is determined whether Wchange exceeds a pre-set change threshold K, for example, K is 5%, wherein the change threshold setting can be set according to an actual demand of the weighing measurement, and not limited to the examples in this embodiment.

When the threshold K is exceeded, the weighing procedure is exited.

Figure 2:
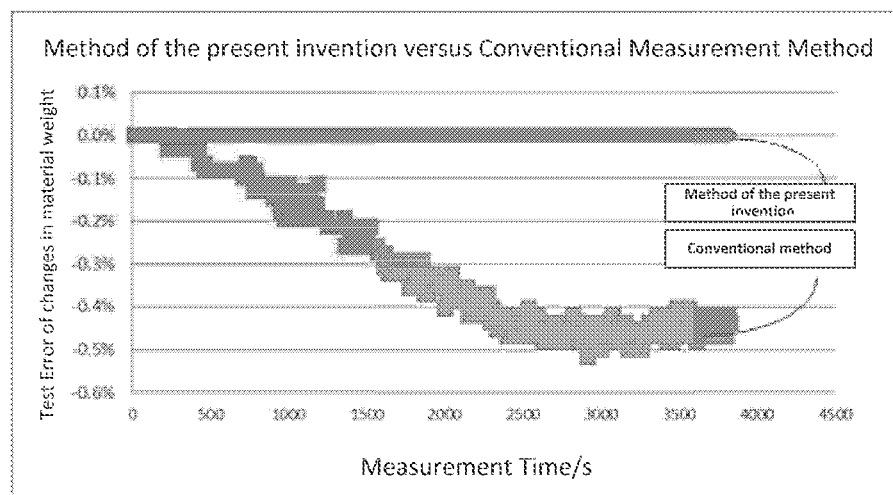
FIG. 2 is a test contrast diagram of the weighing method of Embodiment 1 of the present invention versus a conventional weighing method.

FIG. 2 is a graph showing changes in the error of the weighing unit itself when a continuous weighing test of this embodiment is applied versus when a conventional method is used for performing a weighing test, wherein the precision of the weighing unit will be affected by the temperature gradient produced by a heated material, and therefore, during the whole weighing process, the zero point and the sensitivity of the weighing module vary greatly due to the influence of the temperature gradient. As shown in the figure, in the conventional testing method, since the zero point and the sensitivity of the weighing unit 1 vary, as the measurement time changes, the weighing error is increasing up to an extent of −0.5%. However, by using the design of this embodiment, the errors of the weighing unit 1 itself are substantially excluded.

Embodiment 2

The difference between the present embodiment and Embodiment 1 lies in that: in the present embodiment the weighing plate 5 is replaced with a thermo-gravimetric weighing plate provided with a sensor, and the sensor provided thereon can detect the temperature, the heat flow, the pressure, the humidity, the radiation and the accelerated velocity. In a variant, other sensors for physical measurement or chemical measurements can be further provided (except for the weighing function of the weighing unit 1). In another example, the arrangement position of the sensor relative to the thermo-gravimetric weighing plate not only can be arranged on an upper row of the weighing plate, but also can be arranged in a space surrounding the weighing plate so as to more accurately detect the position where the environment parameters of in the weighing plate change.

These sensors realise the function of measuring parameters such as the temperature of the weighing unit 1. These parameters of the weighing unit can significantly affect the performance of the weighing unit 1, especially the weighing value measured by the weighing unit.

In another embodiment, the weighing plate 5 can also be replaced with a thermo-gravimetric weighing plate which is integrally formed with a sensor, and at this time, the sensor has functions of detecting the temperature, the heat flow, the pressure, the humidity, the radiation and the accelerated velocity, and the integral forming manner facilitates better monitoring of the environment parameters of the thermo-gravimetric weighing plate.

The present embodiment is applicable to an analyser, a thermal analyser or a thermo-gravimetric analyser, and in the present embodiment, according to the principle of a measurement instrument, a sensor that can detect measurement instrument principle dependent parameter is used, for example, a sensor that can detect the temperature or the temperature change of a sample placed on a load receiving apparatus, or the heat flow through the sample.

Furthermore, in another embodiment, in the thermo-gravimetric analyser, the weighing unit 1 is mounted in a cabinet that is far away from a heating chamber, and meanwhile the cabinet realises a stable cabinet environment by a further environment stabilized apparatus 6.

Through the above description of the weighing methods, it can be clearly understood by those skilled in the art that the present invention can be implemented by means of software and necessary hardware platforms. Based on such understanding, the technical solutions of the present invention, essentially or for a contribution part in the prior art, can be embodied in the form of a software product, wherein the computer software product may be stored in a storage medium, including but not limited to a ROM/RAM (Read Only Memory/Random Access Memory), a magnetic disk, an optical disk, etc., and may include several instructions for causing one or more computer devices (which may be a personal computer, a server, or a network device, or the like) to perform the method described in the various embodiments or in certain parts of the embodiments of the present invention.

While the particular embodiments of the present invention have been described above, a person skilled in the art should understand that these are merely illustrative, and that the scope of protection of the present invention is defined by the appended claims. Various alterations or modifications to these embodiments can be made by a person skilled in the art without departing from the principle and essence of the present invention; however, all these alterations and modifications fall within the scope of protection of the present invention.

What is claimed is:

1. A weighing system, comprising:
   a weighing plate,
   a weighing unit,
   a separation mechanism, configured to control a separation of the weighing plate and the weighing unit, so that no force is applied to the weighing unit by the weighing plate, or the combination of the weighing plate and an object to be weighed carried by the weighing plate; and
   a weight loading mechanism, configured to load a weight onto the weighing unit or to remove a weight therefrom;
   wherein the weighing system is configured to record a weighing value of the weighing unit during the action of the separation mechanism and a sensitivity value during the action of the weight loading mechanism; and
   wherein the weighing system is configured to modify the weighing value at the time of the most recent combination of the weighing plate and the weighing unit based on the recorded weighing value and sensitivity value.

2. The weighing system of claim 1, further comprising:
   a weight transfer unit, as a part of the separation mechanism, which lies between the weighing plate and the weighing unit, to transfer the weight of the material carried by the weighing plate to the weighing unit; or
   a weight transfer unit, controlled by the separation mechanism, which lies between the weighing plate and the weighing unit;
   so that no force is applied to the weighing unit by the weighing plate, or the combination of the weighing plate and an object to be weighed carried by the weighing plate.

3. The weighing system of claim 1, wherein the weighing system is configured to record, at a pre-set period, the weighing value of the weighing unit during the action of the separation mechanism and the sensitivity value during the action of the weight loading mechanism.

4. The weighing system of claim 1, wherein the weighing system records weighing values of the weighing unit during the action of the separation mechanism, at the time of separation of the weighing plate and the weighing unit and at the time of combination of the weighing plate and the weighing unit.

5. The weighing system of claim 1, further comprising:
   at least one environment perception sensor, the sensor being mounted on or nearby the weighing plate for detecting and acquiring an environment parameter, and
   at least one weighing environment auxiliary module for reducing the influence of an environment change on the weighing system.

6. The weighing system of claim 5, further comprising: a processor that records the weighing value of the weighing unit during the action of the separation mechanism and the sensitivity value during the action of the weight loading mechanism, and calculates, modifies and outputs the weighing value at the time of the most recent combination of the weighing plate and the weighing unit, wherein the controller further modifies the weighing value at the time of the most recent combination of the weighing plate and the weighing unit based on the environment parameter.

7. The weighing system of claim 1, further comprising: a processor that records the weighing value of the weighing unit during the action of the separation mechanism and the sensitivity value during the action of the weight loading mechanism, and calculates, modifies and outputs the weighing value at the time of the most recent combination of the weighing plate and the weighing unit.

8. A thermo-gravimetric analyser, comprising:
   the weighing system of claim 1, wherein the separation mechanism controls the separation of a thermo-gravimetric weighing plate and a weighing unit, and
   a sensor for detecting an environment parameter being provided on or nearby the thermo-gravimetric weighing plate, or the thermo-gravimetric weighing plate and the sensor are integrally formed.

9. A weighing method for a weighing system comprising a weighing plate, a weighing unit, a separation mechanism, and a weight loading mechanism; wherein the method comprises the steps of:
   performing, sequentially, weighing plate and weighing unit separation actions by the separation mechanism, and weight loading actions by the weight loading mechanism, recording a weighing value during each weighing plate and weighing unit separation action, and recording a sensitivity value during each weight loading action; and modifying the weighing value at the time of the most recent combination of the weighing plate and the weighing unit based on the recorded weighing value and sensitivity value.

10. The weighing method of claim 9, wherein the steps of performing and recording are conducted at a predetermined test interval.

11. The weighing method of claim 10, wherein the step of modifying the weighing value uses the formula:

$$Wtrue = Wi \times \frac{Si}{S0}$$

where Wtrue is a modified weighing value, Wi is a weighing value at the time of the most recent combination of the weighing plate and the weighing unit, Si is the most recently recorded sensitivity value, and S0 is a firstly recorded sensitivity value.

12. The weighing method of claim 11, wherein the weighing values WI of the weighing unit recorded during the action of the separation mechanism, at the time of separation of the weighing plate and the weighing unit and at the time of combination of the weighing plate and the weighing unit are calculated at the time of combination of the weighing plate and the weighing unit using the formula:

$$Wi = Wfi - Wzi$$

where Wfi is a weighing value at the time of combination of the weighing plate and the weighing unit, and Wzi is a weighing value at the time of separation of the weighing plate and the weighing unit.

13. The weighing method of claim 11, further comprising the step of:

acquiring an environment parameter on or nearby the weighing plate, and using the environment parameter to modify the modified weighing value Wtruei.

14. The weighing method of claim 9, further comprising the steps of:

calculating a weighing data change Wchange, after recording a weighing value during each weighing plate and weighing unit separation action and recording a sensitivity during each weight loading action, using the formula:

$$Wchange = W1 - W0$$

where Wi is a weighing value at the time of combination of the weighing plate and the weighing unit, and W0 is a weighing value at the time of the first combination of the weighing plate and the weighing unit; and exiting the weighing procedure when Wchange exceeds a predetermined change threshold.

15. A storage medium, comprising: a stored program, wherein the program, when running, is configured to control an apparatus in which the storage medium is located to execute the weighing method of claim 9.

\* \* \* \* \*

UNITED STATES PATENT AND TRADEMARK OFFICE
CERTIFICATE OF CORRECTION

PATENT NO. : 11,959,934 B2
APPLICATION NO. : 16/982695
DATED : April 16, 2024
INVENTOR(S) : Xu et al.

Page 1 of 1

It is certified that error appears in the above-identified patent and that said Letters Patent is hereby corrected as shown below:

In the Specification

In Column 4, Line 39, please delete "Wtrue=Wi×Si/S0" and insert --  --.

In the Claims

In Column 11, Line 24, Claim 12, please delete "WI" and insert -- Wi --.

In Column 12, Line 18, Claim 14, please delete "Wchange=W1–W0" and insert -- Wchange=Wi-W0 --.

Signed and Sealed this
Twenty-first Day of May, 2024

Katherine Kelly Vidal
*Director of the United States Patent and Trademark Office*